(12) United States Patent
Ferrato et al.

(10) Patent No.: US 12,112,515 B2
(45) Date of Patent: Oct. 8, 2024

(54) TECHNIQUE FOR GENERATING A LABELED SET OF IMAGES

(71) Applicant: Airbus Defence and Space GmbH, Taufkirchen (DE)

(72) Inventors: Matthieu Ferrato, Taufkirchen (DE); Rémi Rivière, Taufkirchen (DE); Henrique Candeias, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 653 days.

(21) Appl. No.: 17/356,720

(22) Filed: Jun. 24, 2021

(65) Prior Publication Data

US 2021/0406580 A1    Dec. 30, 2021

(30) Foreign Application Priority Data

Jun. 26, 2020    (EP) .................................. 20182680

(51) Int. Cl.
| | |
|---|---|
| *G06N 20/00* | (2019.01) |
| *G06F 18/214* | (2023.01) |
| *G06F 18/23* | (2023.01) |
| *G06V 10/44* | (2022.01) |
| *G06V 10/60* | (2022.01) |
| *G06V 10/764* | (2022.01) |
| *G06V 10/774* | (2022.01) |
| *G06V 10/82* | (2022.01) |

(52) U.S. Cl.
CPC ............ *G06V 10/44* (2022.01); *G06F 18/214* (2023.01); *G06F 18/23* (2023.01); *G06N 20/00* (2019.01); *G06V 10/60* (2022.01); *G06V 10/764* (2022.01); *G06V 10/774* (2022.01); *G06V 10/82* (2022.01)

(58) Field of Classification Search
None
See application file for complete search history.

(56) References Cited

U.S. PATENT DOCUMENTS

2020/0213581 A1*   7/2020   Lu .......................... H04N 25/61

FOREIGN PATENT DOCUMENTS

EP            3751447 A1    12/2020

OTHER PUBLICATIONS

European Search Report; priority document.
(Continued)

*Primary Examiner* — Dov Popovici
(74) *Attorney, Agent, or Firm* — Greer, Burns & Crain, Ltd.

(57) ABSTRACT

A method for generating a labeled set of images for use in machine learning based stray light characterization for space-related optical systems. The method includes (a) obtaining a set of images simulated for a space-related optical system, wherein the images of the set of images contain stray light simulated for the space-related optical system, (b) for each image of the set of images, identifying one or more clusters of light contained in the respective image and labeling the respective image by the one or more clusters of light, wherein the one or more clusters of light include at least one cluster of stray light, and (c) creating, based on the labeled images of the set of images, a plurality of new labeled images by applying transformations to the labeled images to generate an augmented set of labeled images.

10 Claims, 9 Drawing Sheets

(56) References Cited

OTHER PUBLICATIONS

E. Berkson et al., "Synthetic Data Generation to Mitigate the Low/No-Shot Problem in Machine Learning" Lockheed Martin Corporation, Palo Alto, California.
C.J. Diaz Baso et al., "Enhancing SDO/HMI Images Using Deep Learning" Institutdo de Astrofisica de Canarias, Tenerife, Spain; Departamento de Astrofisica, Universidad de La Laguna, Tenerife, Spain.
P. Wang et al., "A New Automatic Tool for CME Detection and Tracking with Machine Learning Techniques" Department of Computer Science and Technology, Nanjing University, 210023 Nanjing, China, Key Laboratory of Dark Matter and Space Astronomy, Purple Mountain Observatory, Chinese Academy of Sciences, 210034 Nanjing, China, School of Astronomy and Space Science, University of Science and Technology of China, Hefei, Anhui, 230026, China.

\* cited by examiner

TECHNIQUE FOR GENERATING A LABELED SET OF IMAGES

CROSS-REFERENCES TO RELATED APPLICATIONS

This application claims the benefit of the European patent application No. 20182680.7 filed on Jun. 26, 2020, the entire disclosures of which are incorporated herein by way of reference.

BACKGROUND OF THE INVENTION

The present disclosure generally relates to space-related optical systems. In particular, a technique for generating a labeled set of images for use in machine learning based stray light characterization for space-related optical systems is presented. The technique may be embodied in methods, computer programs and apparatuses.

SUMMARY OF THE INVENTION

In the field of space-borne optical instrument imaging, images are typically characterized on-ground. In characterization campaigns and the post-processing of such images, complex patterns, such as stray light effects observed when acquiring the images, may either be ignored (however, this may jeopardize precision and optical instrument performance) or may undergo further characterization. In the latter case, it is generally known to employ artificial intelligence techniques, such as convolutional neural networks, to characterize, track, process and/or extrapolate complex patterns, for example. An exemplary stray light characterization technique using a supervised machine learning approach is described in patent application EP19180304.8 filed on 14 Jun. 2019, for example.

Figure 1:
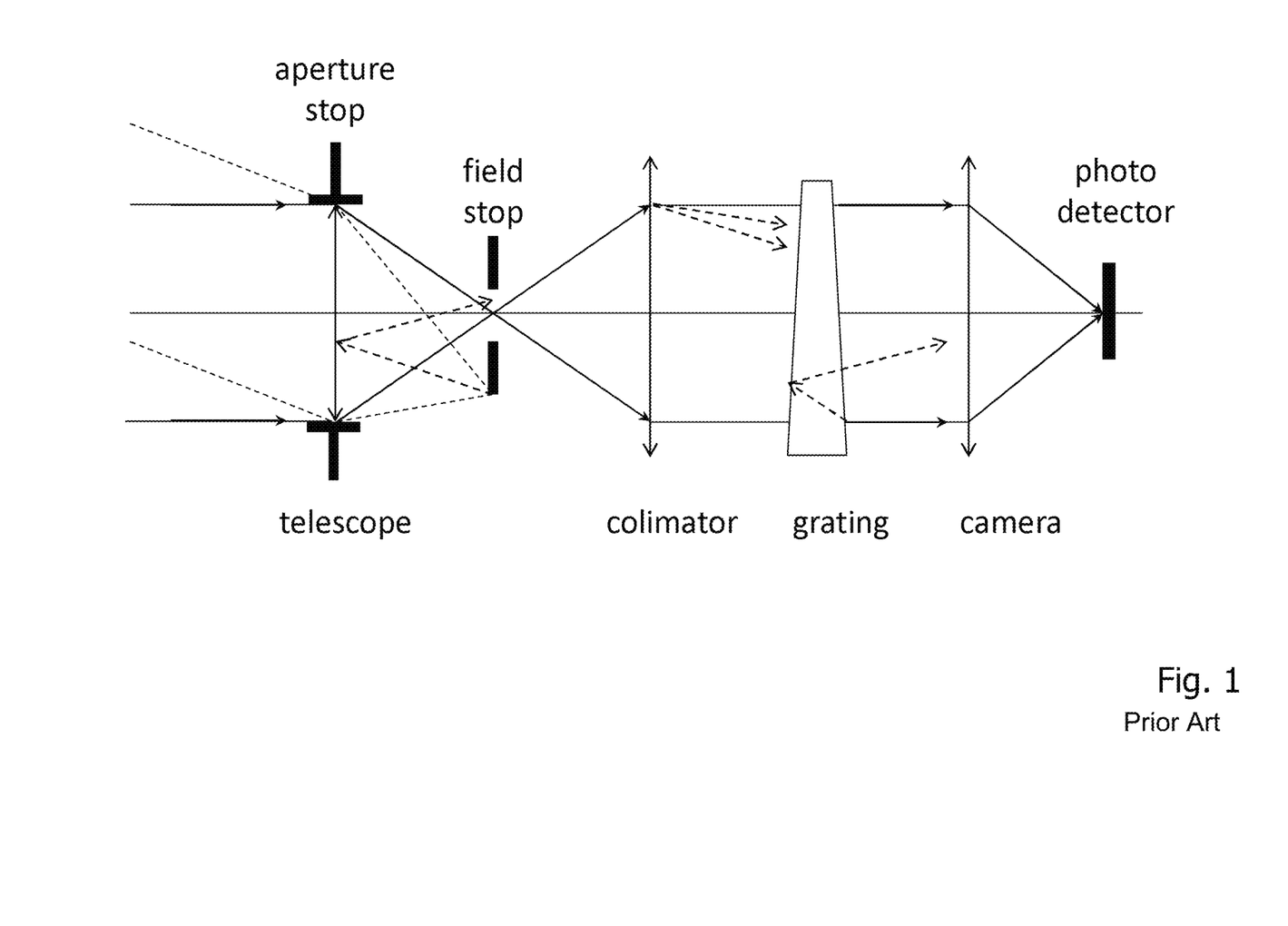
FIG. 1 illustrates exemplary paths of nominal light and stray light in an optical instrument, such as a spectrometer.
Figure 2:
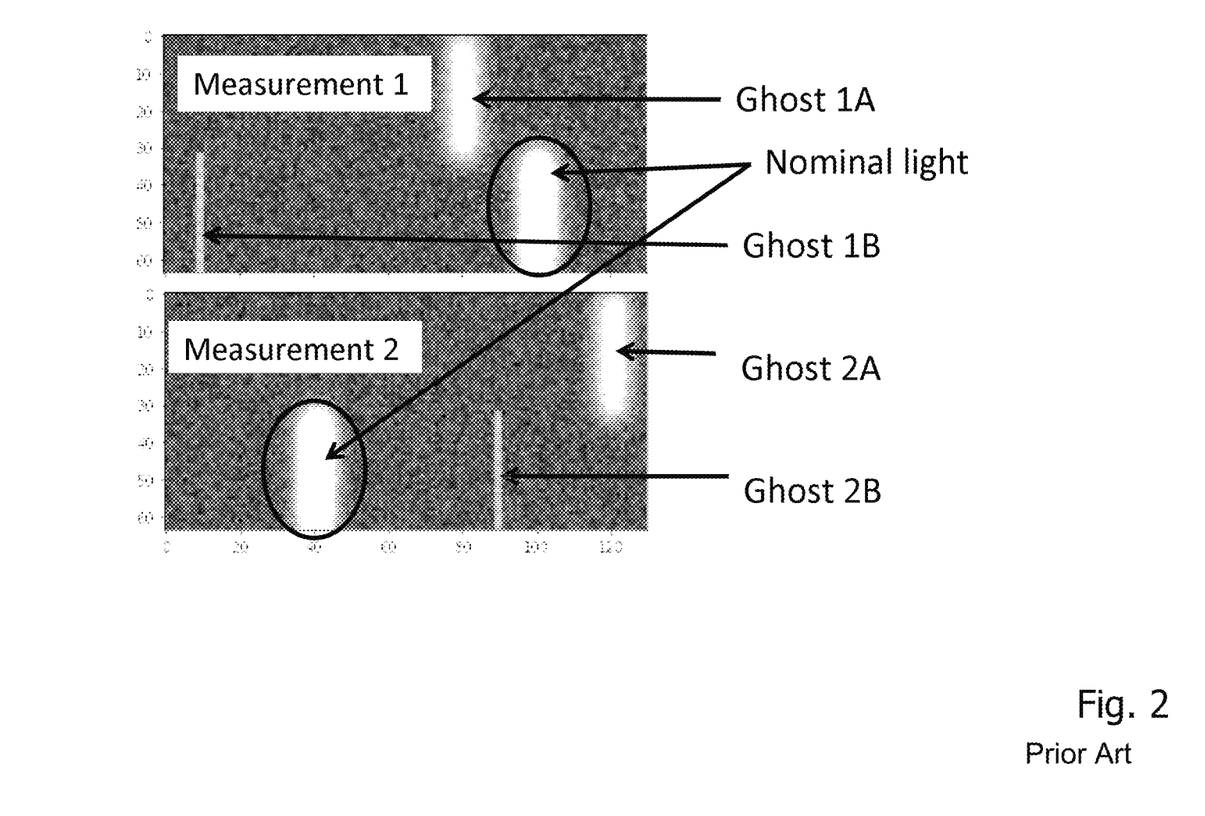
FIG. 2 illustrates exemplary stray light effects for two sample measurements simulated for an optical instrument, such as a spectrometer.

Stray light corresponds to parasitic light which reaches the detector of an optical instrument and, as such, stray light may be an important cause of the radiometric accuracy error of optical space systems, in particular spectrometers. FIG. 1 illustrates an exemplary composition of an optical instrument together with an indication of the typical light paths in the optical instrument, wherein the solid lines represent nominal light paths and the dashed lines represent potential paths of stray light. Stray light may be induced by scattering, reflection and/or diffraction of light, for example, or may be caused by Fresnel reflections (also known as "ghost" reflections), i.e., by return portions of incident light at an interface between two media having different refractive indices. FIG. 2 illustrates exemplary ghost stray light effects for two different simulated measurements, wherein each measurement reveals two ghost reflections besides the nominal light of a light source.

For suitable and efficient operation, supervised artificial intelligence techniques need to be trained on significantly large and revealing (e.g., simulated) training databases (e.g., kernel images), which are generally costly to obtain and to classify. According to conventional approaches, classical statistical data analysis is used along with human verification of the results to obtain the relevant training data. For example, training data has to be individually segmented and labeled by human supervision. In order to suitably and efficiently train supervised artificial intelligence algorithms, all (e.g., simulated) training images have to be fully characterized and categorized for each pixel (i.e., requiring the labeling of each pixel of typically thousands, or even millions, of images), and the generation of correspondingly labeled databases therefore not only requires extensive human intervention, but is also expensive in terms of time, money and the required computational resources.

SUMMARY OF THE INVENTION

It is thus an object of the present disclosure to provide a technique which allows obtaining simulated training data for machine learning based stray light characterization in a less expensive manner.

According to a first aspect of the present disclosure, a method for generating a labeled set of images for use in machine learning based stray light characterization for space-related optical systems is provided. The method comprises (a) obtaining a set of images simulated for a space-related optical system, wherein the images of the set of images contain stray light simulated for the space-related optical system, (b) for each image of the set of images, identifying one or more clusters of light contained in the respective image and labeling the respective image by the one or more clusters of light, wherein the one or more clusters of light comprise at least one cluster of stray light, and (c) creating, based on the labeled images of the set of images, a plurality of new labeled images by applying transformations to the labeled images to generate an augmented set of labeled images.

The space-related optical system may correspond to a space-related optical instrument, such as an earth/space observation optical instrument, like a spectrometer, for example. The set of images simulated for the space-related optical system may correspond to images obtained in an optical instrument simulation campaign, wherein the simulated images (representative of simulated measurements) may need to be further characterized in terms of their stray light characteristics, for example. Each image in the set of images simulated for the space-related optical system may thus contain stray light effects simulated for the space-related optical system, i.e., stray light effects as they would be observed when acquiring the images with the space-related optical system in real. The characterization of stray light may also be denoted as "analysis" of stray light, such as tracking and/or recognition of stray light, for example.

Instead of labeling the acquired images in terms of their stray light characteristics by classical data analysis and human verification, as described above for conventional approaches, the technique presented herein may provide an automated procedure which may label only a (e.g., small) set of images in terms of their stray light characteristics, and then may apply (e.g., mathematical) transformations to generate new labeled images to thereby obtain an augmented set of labeled images. The presented technique may thus be considered as an automated technique usable to generate an enlarged training data set for machine learning based stray light characterization. The method may, as such, further comprise using the augmented set of labeled images to train a model for machine learning based stray light characterization for a (real) space-related optical system. The training data set may in other words be used to train supervised artificial intelligence methods that specialize in stray light tracking and/or recognition, for example.

Once trained, the machine learning model may be used for actual inference, i.e., to perform stray light characterization on an image acquired by a (real) space-related optical system (e.g., on a real measurement image, i.e., an image not forming part of the set of simulated images used for training, such as a measurement image acquired in an actual measurement campaign by a real space-related optical system).

The method may thus further comprise performing stray light characterization on an image acquired by a space-related optical system using the trained model. Stray light characterization may be performed in accordance with known stray light characterization techniques, such as the technique described in patent application EP19180304.8 filed on 14 Jun. 2019, for example.

In order to generate the augmented training data set according to the technique presented herein, a set of images may first be obtained by simulating the images for the space-related optical system in accordance with step (a). Simulating an image for the space-related optical system may involve generating the image using a simulation/modeling software, such as Zemax, for example. This may require a priori knowledge of possible stray light features (e.g., shapes and numbers of stray light effects) typically observed with the space-related optical system. The set of images may thus be generated to be representative of the stray light effects as they would be observed with the space-related optical system. In accordance with step (b), for each image of the set of images, one or more clusters of light contained in the respective image may then be identified. The one or more clusters of light may comprise a cluster of nominal light, which may be the primary (e.g., most bright) cluster of light contained in the respective image. The one or more clusters of light may also comprise at least one cluster of stray light. A cluster of nominal light may be associated with a laser ray injection point assumed for the space-related optical system, for example, as will be described in more detail below. Stray light may correspond to light of the type described above, i.e., stray light may be induced by scattering, reflection and/or diffraction of light in the space-related optical system, or may be caused by Fresnel reflections, for example. Each of the at least one cluster of stray light identified in the respective image may be representative of a different shape of stray light contained in the respective image.

The one or more clusters of light may be identified using an unsupervised machine learning algorithm, such as a conventional clustering algorithm like DBSCAN, which may apply pixel-wise nearest-neighbor recognition in order to determine the one or more clusters of light, for example. Such algorithm may take an image of the set of images as input, perform clustering accordingly, and provide the resulting clustering information as output. The clustering information may then be used to label the image, i.e., in other words, the image may be labeled by the one or more identified clusters of light. In one variant, the respective image may be labeled pixel-wise, wherein each pixel of the respective image may be assigned at least one label indicating to which of the one or more clusters of light the pixel belongs. In particular, for each cluster among the one or more clusters of light, a separate label may be assigned to each pixel of the respective image, indicating that the pixel belongs to the respective cluster. For example, assuming that the one or more clusters of light comprise K clusters, where K is a natural number, each pixel may be assigned K Boolean values (e.g., true/false), wherein the kth Boolean value indicates whether or not the pixel belongs to the kth cluster among the one or more identified clusters of light.

Space-related optical systems, such as spectrometers, may comprise a laser for the generation of a laser ray whose injection point may be used to generate a light source that appears on acquired (measurement) images (e.g., the generated light source being representative of the measurements carried out in a measurement campaign) and is to be analyzed spectroscopically with respect to its light characteristics. The typical wavelength of interest of the analyzed light may be in the range from ultraviolet light to far infrared light, for example. For the purpose of the generation of the set of images in accordance with step (a), such laser ray injection point may be simulated (or "assumed") for the space-related optical system. The light source generated by the simulated/assumed laser ray injection point may correspond to the nominal light contained in the simulated images. When simulating a set of images during the simulation campaign, as described above, the simulated/assumed injection point of the laser ray may be moved (or, more generally, changed) in each image in the set of images, so that a sequence of images with moving (or "changing") injection points may be generated. Each image of the set of images simulated for by the space-related optical system may thus be simulated using a different laser ray injection point assumed for the space-related optical system (i.e., as it would be effected by the space-related optical system in real), wherein the one or more clusters of light may comprise a cluster of nominal light associated with the laser ray injection point assumed for the space-related optical system for the respective image.

When the images are simulated for the space-related optical system, the images may be stored in a predefined data format and the clustering algorithm may operate on that data format to identify the one or more clusters. In one variant, the data format may correspond to a 4-dimensional data cube in which each image of the set of images may be represented as a 2-dimensional image, wherein each pixel of the respective 2-dimensional image may be associated with a grayscale value and an indication of whether or not the respective pixel belongs to the laser ray injection point assumed for the space-related optical system for the respective image. The one or more clusters of light may then be identified from the 4-dimensional data cube.

In accordance with step (c), a plurality of new labeled images may be created based on the thus labeled images by applying transformations to the images, as said, in order to thereby generate an augmented set of labeled images which may be used to train a (e.g., supervised) machine learning model for stray light characterization. The transformations may correspond to mathematical image transformations and, as such, may comprise at least one of rotation, translation, scaling and amplitude adjustment (e.g., amplitude reduction or increase), for example. It will be understood, however, that any other type of image transformation which creates variance in the newly generated labeled images may generally be employed.

At least one of the translations applied to the labeled images may be performed cluster-wise (or, in other words, "per cluster" or "in a cluster-specific manner"), i.e., each translation may be performed on one of the one or more clusters of light independently from the translations performed on others of the one or more clusters of light, so that, for each cluster, a different transformation may be applied. In one particular variant, a plurality of transformations applied to the labeled images may be performed cluster-wise in the above sense, wherein the augmented set of labeled images may then include combinatorial permutations of the cluster-wise transformations. In this way, a combinatorial number of new labeled images may be generated, thereby achieving a huge number of labeled images for the augmented training data set, even though only a small number of images had initially been obtained as the set of images used as basis for the further calculations of steps (b) and (c).

The technique presented herein may as such provide a fast and automated method to generate labeled training data for use in machine learning based stray light characterization. The set of images selected as basis for the further calculations in steps (b) and (c) may only comprise a small number of images (e.g., less than 10, 5, 2 or 1 percent of a typical set of images acquired in a measurement campaign). In one possible example, a suitable size of the set of images may be 10 images, for example, whereas thousands, or even millions, of new labeled images may be generated by respective combinatorial permutations of cluster-wise transformations. Due to the set of images being representative of the optical system stray light effects, the thus generated training data may lead to precise characterization results when the correspondingly trained model is employed for inference. The harnessed machine learning capabilities may therefore not only lead to automatic and faster characterization, but may also decrease the necessity of human intervention and reduce costs in general. Rather than several days, which may typically be required to generate and cluster a database on Zemax, significantly reduced processing time for the characterization of stray light may be accomplished.

According to a second aspect, a computer program product is provided. The computer program product comprises program code portions for carrying out one or more of the steps of any of the method aspects described herein, when the computer program product is run or executed on a computer system or on one or more computing devices. The computer program product may be stored on a computer readable recording medium, such as a permanent or rewritable memory.

According to a third aspect, a computing unit for generating a labeled set of images for use in machine learning based stray light characterization for space-related optical systems is provided. The computing unit comprises at least one processor and at least one memory, the at least one memory containing instructions executable by the at least one processor such that the computing unit is operable to (a) obtain a set of images simulated for a space-related optical system, wherein the images of the set of images contain stray light simulated for the space-related optical system, (b) for each image of the set of images, identify one or more clusters of light contained in the respective image and label the respective image by the one or more clusters of light, wherein the one or more clusters of light comprise at least one cluster of stray light, and (c) create, based on the labeled images of the set of images, a plurality of new labeled images by applying transformations to the labeled images to generate an augmented set of labeled images.

All of the aspects described herein may be implemented by hardware circuitry and/or by software. Even if some of the aspects are described herein with respect to the computing unit, these aspects may also be implemented as a method or as a computer program for performing or executing the method. Likewise, aspects described as or with reference to a method may be realized by the computing unit, or by means of the computer program.

BRIEF DESCRIPTION OF THE DRAWINGS

In the following, the present disclosure will further be described with reference to exemplary implementations illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from the specific details. Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also appreciated that when the present disclosure is described as a method, it may also be embodied in a device (e.g., the computing unit described herein below), a computer processor and a memory coupled to a processor, wherein the memory is encoded with one or more programs that perform the methods disclosed herein when executed by the processor.

Figure 3:
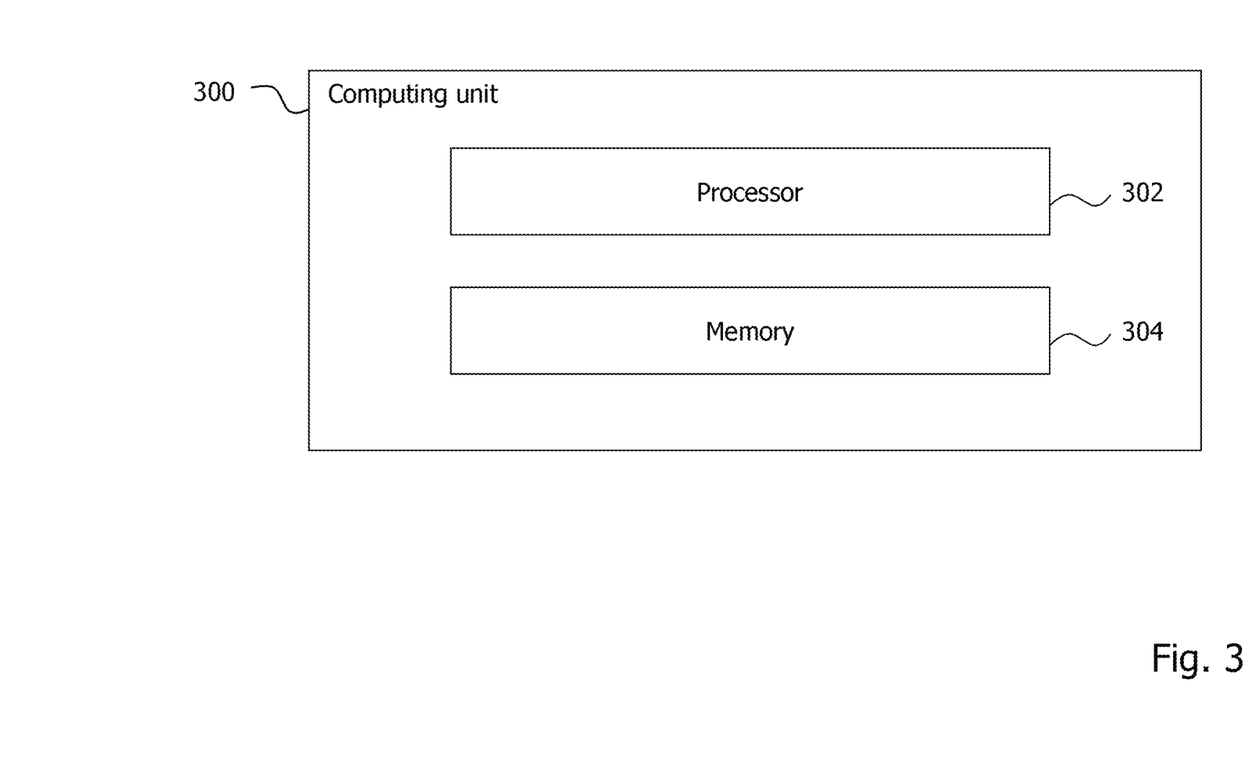
FIG. 3 illustrates an exemplary composition of a computing unit for generating a labeled set of images for use in machine learning based stray light characterization according to the present disclosure.

FIG. 3 schematically illustrates an exemplary composition of a computing unit 300 for generating a labeled set of images for use in machine learning based stray light characterization for space-related optical systems. The computing unit 300 comprises at least one processor 302 and at least one memory 304, wherein the at least one memory 304 contains instructions executable by the at least one processor 302 such that the computing unit 300 is operable to carry out the method steps described herein below.

It will be understood that the computing unit 300 may be implemented on a physical computing unit or a virtualized computing unit, such as a virtual machine, for example. It will further be appreciated that the computing unit 300 may not necessarily be implemented on a standalone computing unit, but may be implemented as components—realized in software and/or hardware—residing on multiple distributed computing units as well, such as in a cloud computing environment, for example.

Figure 4:
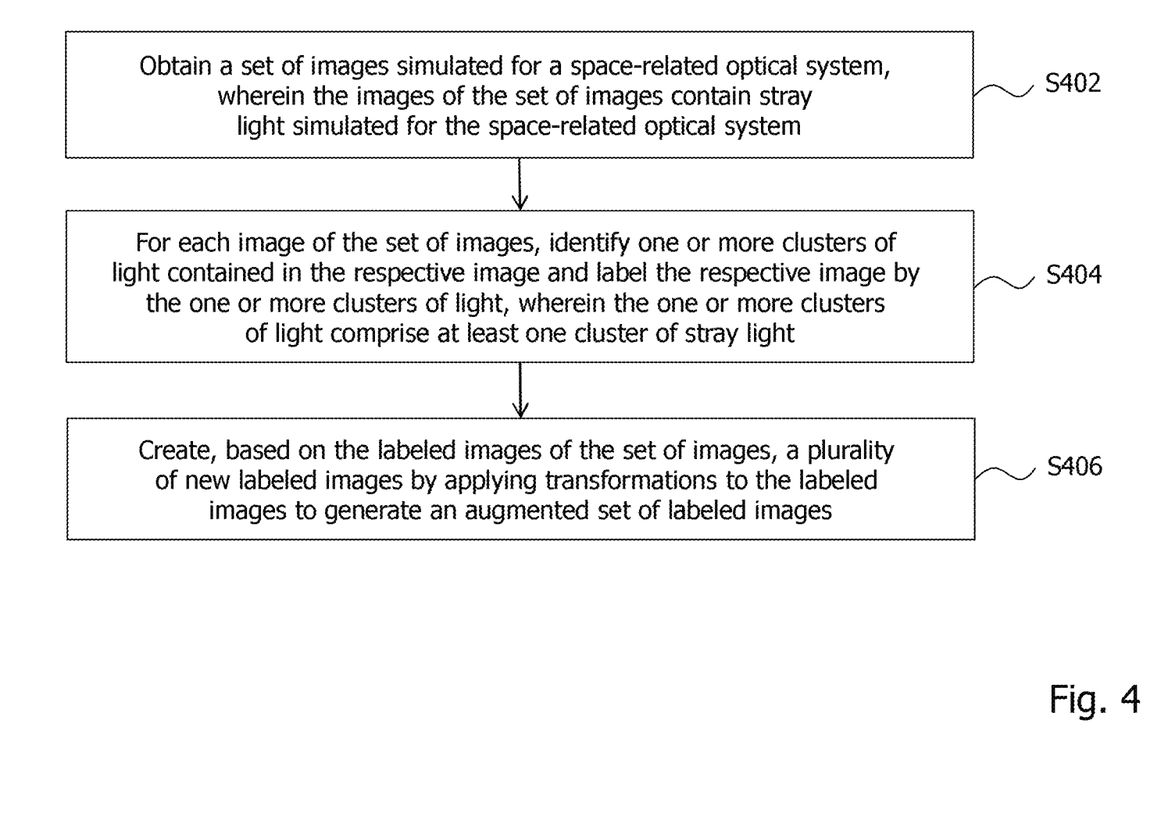
FIG. 4 illustrates a method which may be performed by the computing unit according to the present disclosure.

FIG. 4 illustrates an overview of the above-described method, which may be performed by the computing unit 300. As described above, the method is dedicated to generating a labeled set of images for use in machine learning based stray light characterization for space-related optical systems. In step S402, the computing unit 300 may (a)

obtain a set of images simulated for a space-related optical system, wherein the images of the set of images contain stray light simulated for the space-related optical system. In step S404, the computing unit 300 may (b), for each image of the set of images, identify one or more clusters of light contained in the respective image and label the respective image by the one or more clusters of light, wherein the one or more clusters of light comprise at least one cluster of stray light. In step S406, the computing unit 300 may (c) create, based on the labeled images of the set of images, a plurality of new labeled images by applying transformations to the labeled images to generate an augmented set of labeled images.

In the following, an exemplary implementation of this method will be described with reference to FIGS. 5 to 9 in order to better elucidate the principles of the technique presented herein. It will be understood that the following description is exemplary only and that details provided in the following are not to be construed as being limiting, but are provided for illustrative purposes only.

Figure 5:
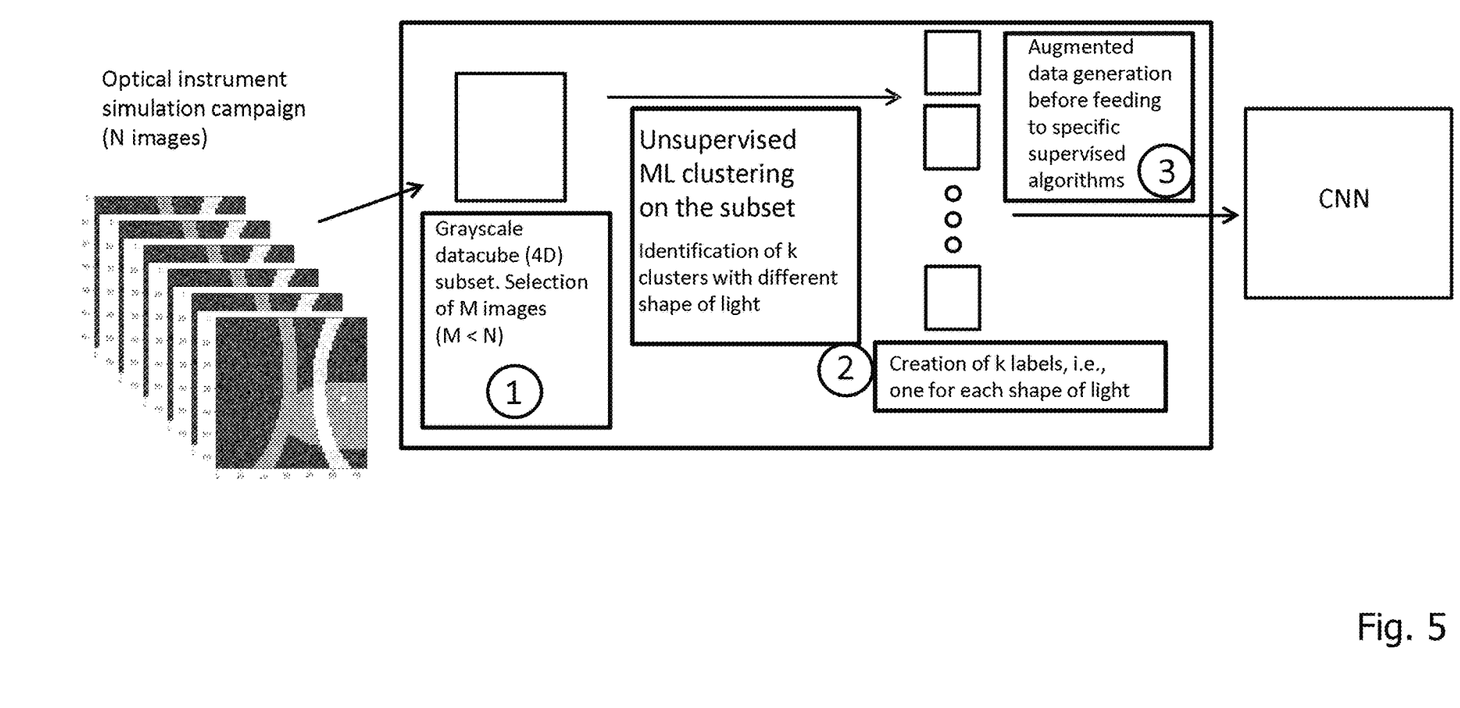
FIG. 5 illustrates an overview of an exemplary implementation of the method according to the present disclosure.
Figure 6:
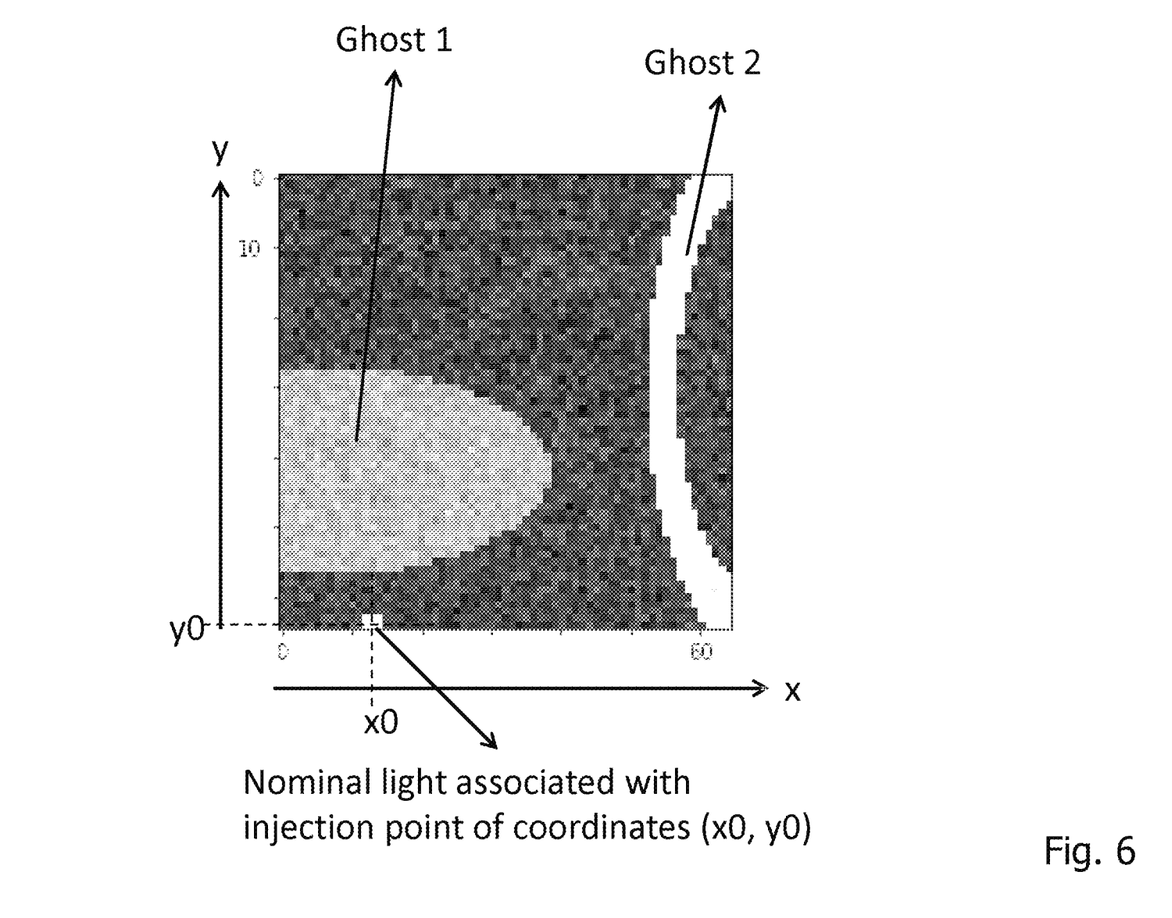
FIG. 6 schematically illustrates a simulated image containing nominal light associated with a laser ray injection point as well as parasitic stray light effects.

FIG. 5 illustrates an overview of the technique presented herein, wherein an optical instrument simulation campaign may be carried out for a space-related optical instrument, such as a spectrometer, to obtain a set of N images representative of the simulation being performed. When simulating the images, such as via a simulation/modeling software, such as Zemax, for example, the optical instrument may be assumed to be subjected to a (simulated) laser ray whose injection point may create a light source that appears on the simulated images and is to be analyzed according to conventional procedures of spectroscopy. The simulated light source may correspond to the nominal light contained in the simulated images. FIG. 6 schematically illustrates an exemplary image containing nominal light associated with a simulated/assumed injection point input at coordinates (x0, y0) as well as two exemplary simulated parasitic stray light effects, which are denoted as "ghost 1" and "ghost 2" in the figure, i.e., stray light effects as they would be observed when acquiring the image with the space-related optical system in real. Each image in the set of simulated images thus may contain stray light effects observed when simulating the images. When simulating the set of images during the simulation campaign, the simulated/assumed injection point of the laser ray may be moved sequentially so that a sequence of images with moving injection points may be generated. The thus simulated images may be stored in the form of a 4-dimensional data cube in which each image of the set of images may be represented as a 2-dimensional image, wherein each pixel of the respective 2-dimensional image may be associated with a grayscale value as well as an indication of whether or not the respective pixel belongs to the laser ray injection point assumed for the optical instrument for the respective image.

Figure 7:
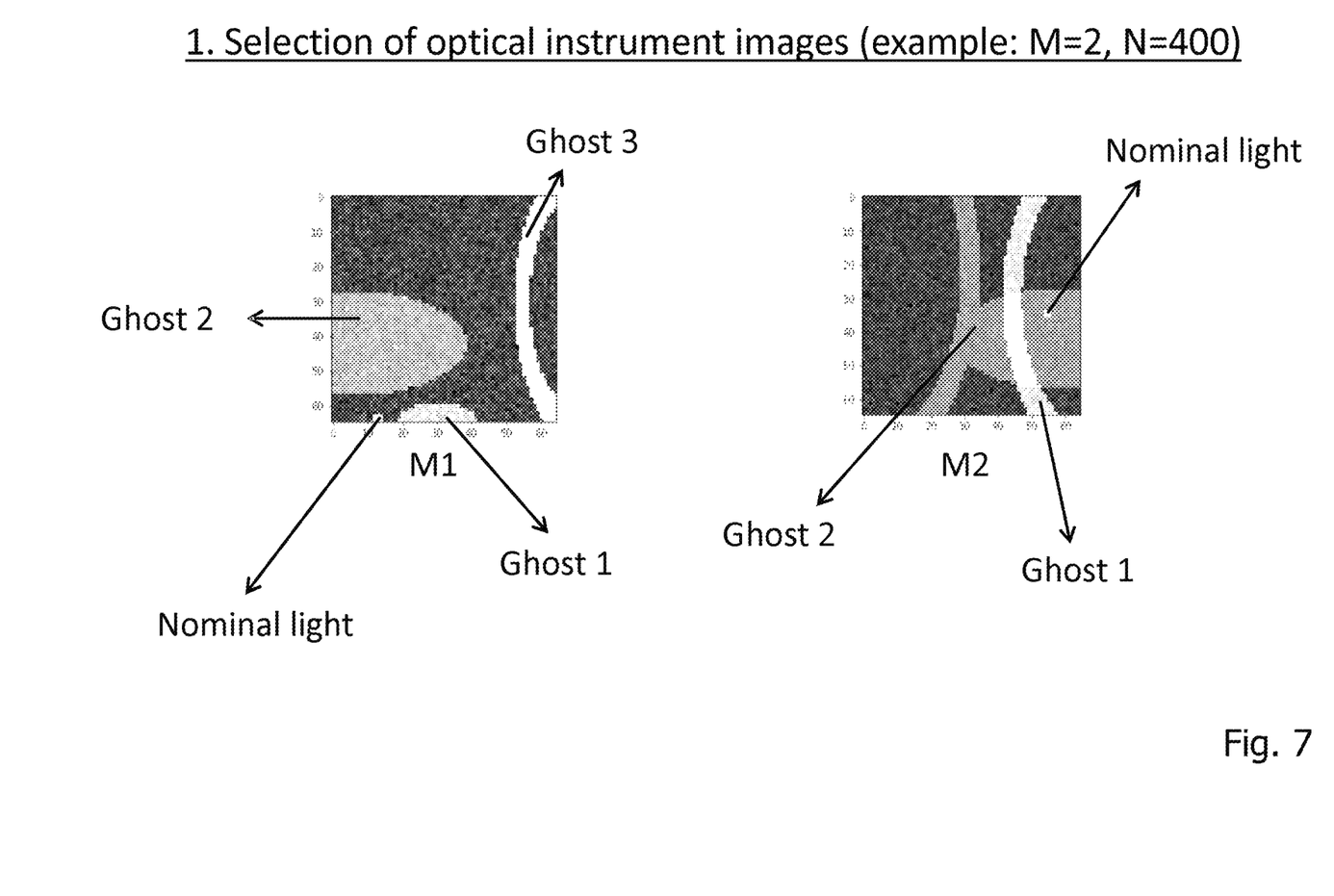
FIG. 7 illustrates an exemplary (optional) selection of a set of representative optical instrument images according to the present disclosure.

In accordance with optional step (1) indicated in FIG. 5, which is more specifically illustrated in FIG. 7, a subset of M images may then be selected. The subset of images may be a true subset so that M<N. As indicated in FIG. 7, in the illustrated example, the total number of simulated images is N=400, whereas only M=2 images are selected as the representative subset of images (indicated as "M1" and "M2" in the figure), i.e., as the subset of images that may be representative of the stray light effects simulated for the optical instrument in the simulation campaign. As shown in FIG. 7, two images with different laser ray injection points resulting in different nominal light coordinates (the precise coordinates of the nominal light are indicated by the arrows in the figure) are selected, wherein image "M1" comprises three parasitic stray light effects denoted as "ghost 1", "ghost 2" and "ghost 3" and image "M2" comprises two parasitic stray light effects denoted as "ghost 1" and "ghost 2" in the figure.

Figure 8:
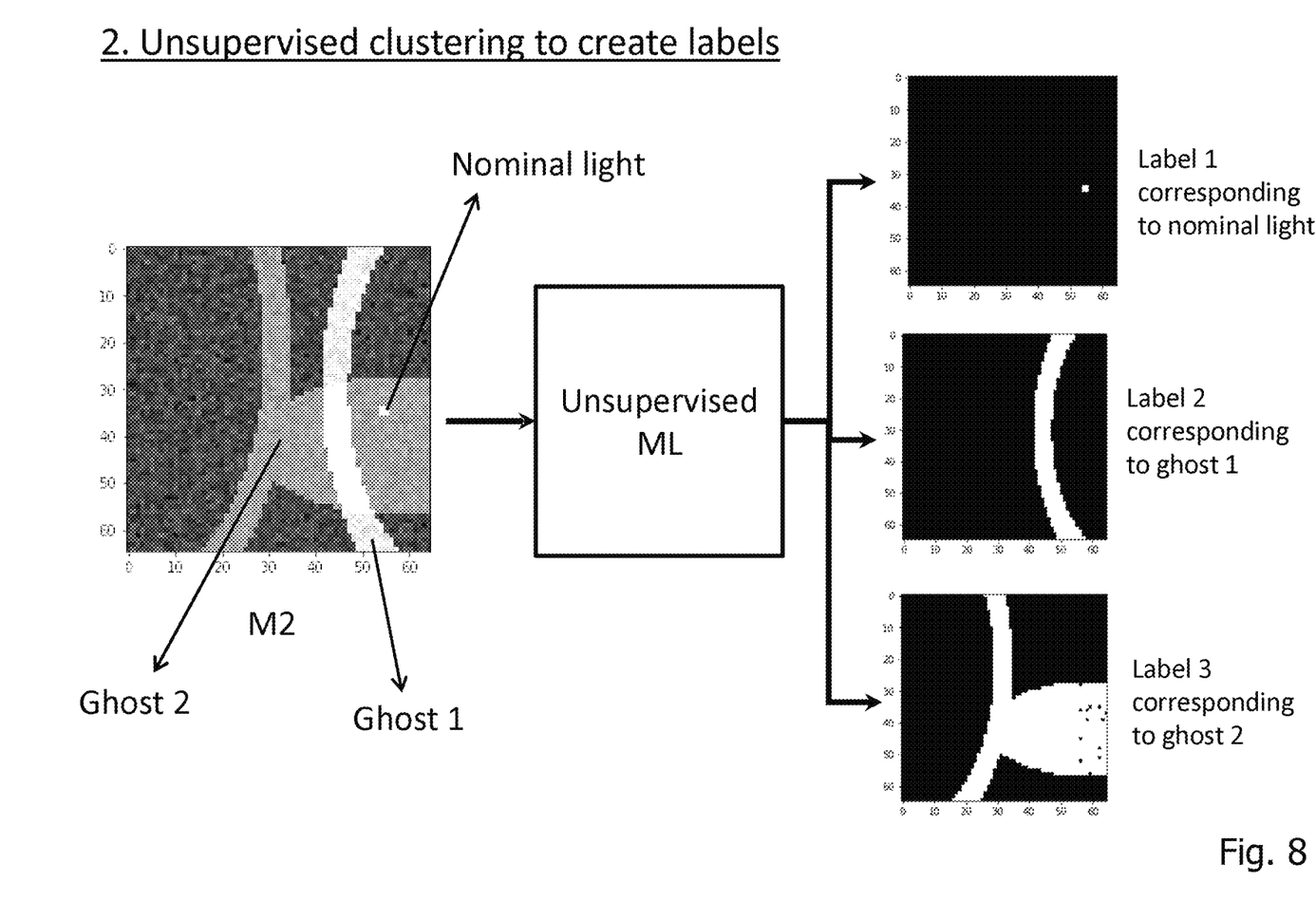
FIG. 8 illustrates exemplary clustering and label creation for an obtained image according to the present disclosure.

In accordance with step (2) indicated in FIG. 5, which is more specifically illustrated in FIG. 8, for each image of the subset of M images, observable clusters of light contained in the respective image may be identified in accordance with step (b) of the technique described herein. To this end, an unsupervised machine learning algorithm, such as a clustering algorithm like DBSCAN (which may apply pixel-wise nearest-neighbor recognition, for example), may be employed in order to determine the clusters of light observable in the respective image. FIG. 8 exemplarily shows the decomposition of image "M2" into respective clusters of light which, in the shown example, not only include the observable clusters of stray light, but also a cluster of nominal light corresponding to the light source generated by the laser ray injection point. As a result, as indicated on the right-hand side of FIG. 8, the unsupervised machine learning algorithm identifies a cluster of nominal light and two clusters of stray light ("ghost 1" and "ghost 2") accordingly.

Based on the resulting clustering information, corresponding label information may be created, by which the image may then be labeled. In the shown example, three labels are created, i.e., "label 1" corresponding to nominal light, "label 2" corresponding to "ghost 1", and "label 3" corresponding to "ghost 2". The label information may be stored pixel-wise so that, for each cluster among the identified clusters, a separate label may be assigned to each pixel of the image, indicating that the pixel belongs to the respective cluster. In the shown example, each pixel may be assigned three Boolean values, wherein the first Boolean value indicates whether or not the respective pixel belongs to "label 1", the second Boolean value indicates whether or not the respective pixel belongs to "label 2", and the third Boolean value indicates whether or not the respective pixel belongs to "label 3", for example. While, in the presented example, the clusters of light that are identified from the image include the cluster of nominal light, it will be understood that, in other variants, only clusters of stray light may be determined from the image (i.e., without the cluster of nominal light), and labels may be created for the clusters of stray light only. The reason is that information on the coordinates of the nominal light may already be known and stored in the 4-dimensional data cube, as described above.

Figure 9:
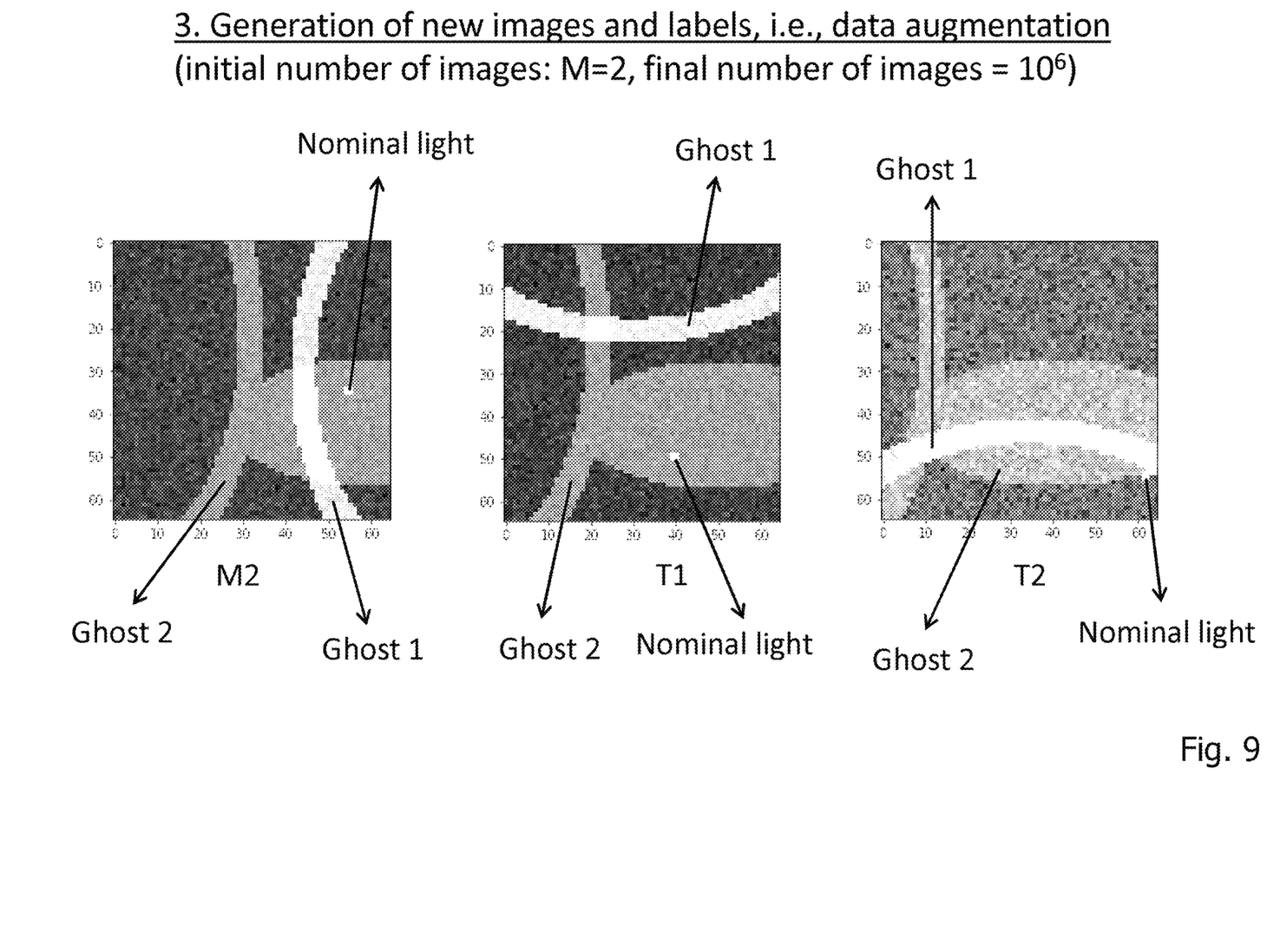
FIG. 9 illustrates exemplary transformations for the generation of new labeled images according to the present disclosure.

In accordance with step (3) indicated in FIG. 5, which is more specifically illustrated in FIG. 9, a plurality of new labeled images may be created by applying mathematical transformations to the thus labeled images to thereby generate an augmented set of labeled images in accordance with step (c) of the technique described herein. FIG. 9 exemplarily illustrates two newly generated labeled images "T1" and "T2", in which cluster-wise transformations have been applied to the original image "M2". In the example of transformed image "T1", the cluster of the nominal light has been subjected to a clockwise rotation about the center of the image, the cluster "ghost 1" has been subjected to a quarterly counter-clockwise rotation about the center of the image, and the cluster "ghost 2" has been subjected to a translational movement in the left direction. In the example of the transformed image "T2", the cluster of the nominal light has been subjected to a translational movement in the downward right direction, the cluster "ghost 1" has been subjected to a quarterly clockwise rotation about the center of the image, the cluster "ghost 2" has been subjected to a translational movement to the left, and the whole image has been subjected to an amplitude reduction.

It will be understood that the transformed images "T1" and "T2" are merely exemplary and that, generally, a combinatorial number of permutations of similar cluster-wise transformations may be performed in an automated manner to thereby generate an augmented data set with a huge number of labeled images. As indicated in FIG. 9, from the initial subset of M=2 representative images, a final number of images of 106 may be generated, for example, thereby obtaining a significantly large and revealing training data set usable to train models for machine learning based stray light characterization, as described above. This is also indicated by an exemplary convolutional neural network (CNN) on the right-hand side of FIG. 5.

As has become apparent from the above, the present disclosure provides a technique for generating a labeled set of images for use in machine learning based stray light characterization for space-related optical systems. The technique may essentially employ an unsupervised artificial intelligence segmentation method to generate a database adapted to stray light segmentation of images acquired by an earth/space observation optical instrument, for example. The unsupervised method may only require few representative images taken from a simulation campaign for the optical instrument, and may create labels identifying stray light pixels on the subset of images. An augmented database of labeled images may then be generated by defined mathematical transformations from the initial subset of images, wherein all new images may be fully pixel-wise labeled. The fully labeled database may then be used for training of machine learning algorithms adapted to stray light characterization, like convolutional neural networks, for example.

As described above, the technique presented herein may as such provide a fast and automated approach to generate labeled training data for use in machine learning based stray light characterization, which may require less human intervention and may eventually achieve robust characterization results while at the same time significantly reducing costs in time, money and required computational resources.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a labeled set of images for use in machine learning based stray light characterization for space-related optical systems, the method comprising:
   (a) obtaining a set of images simulated for a space-related optical system, wherein the images of the set of images contain stray light simulated for the space-related optical system;
   (b) for each image of the set of images,
   identifying one or more clusters of light contained in a respective image, wherein the one or more clusters of light are identified using an unsupervised machine learning algorithm, and
   labeling the respective image by the one or more clusters of light, wherein the respective image is labeled pixel-wise, wherein each pixel of the respective image is assigned at least one label indicating to which of the one or more clusters of light the pixel belongs, wherein the one or more clusters of light comprise a cluster of nominal light, which is the most bright cluster of light contained in the respective image, wherein the one or more clusters of light further comprise at least one cluster of stray light, wherein each of the at least one cluster of stray light identified in the respective image is representative of a different shape of stray light contained in the respective image; and
   (c) creating, based on the labeled images of the set of images, a plurality of new labeled images by applying mathematical image transformations to the labeled images to generate an augmented set of labeled images, wherein the transformations comprise at least one of rotation, translation, scaling, amplitude adjustment or any other type of image transformation which creates variance in the newly created labeled images, and wherein at least one of the transformations applied to the labeled images is performed cluster-wise, such that each transformation is performed on one of the one or more clusters of light independently from the transformations performed on others of the one or more clusters of light, so that, for each cluster, a different transformation may be applied.

2. The method of claim 1, further comprising:
using the augmented set of labeled images to train a model for machine learning based stray light characterization for a space-related optical system.

3. The method of claim 2, further comprising:
performing stray light characterization on an image acquired by a space-related optical system using the trained model.

4. The method of claim 1, wherein, for each cluster among the one or more clusters of light, a separate label is assigned to each pixel of the respective image, indicating that the pixel belongs to a respective cluster.

5. The method of claim 1, wherein each image of the set of images simulated for the space-related optical system is simulated using a different laser ray injection point assumed for the space-related optical system.

6. The method of claim 5, wherein the one or more clusters of light comprise a cluster of nominal light associated with the laser ray injection point assumed for the space-related optical system for the respective image.

7. The method of claim 5, wherein the one or more clusters of light are identified from a 4-dimensional data cube in which each image of the set of images is represented as a 2-dimensional image, wherein each pixel of a respective 2-dimensional image is associated with a grayscale value and an indication of whether or not a respective pixel belongs to the laser ray injection point assumed for the space-related optical system for the respective image.

8. The method of claim 1, wherein a plurality of transformations applied to the labeled images is performed cluster-wise and wherein the augmented set of labeled images includes combinatorial permutations of the cluster-wise transformations.

9. A non-transitory computer readable medium storing a computer program product comprising program code portions which, when executed on a computer system or one or more computing devices, cause the computer system of the one or more computing devices, to:
   (a) obtain a set of images simulated for a space-related optical system, wherein the images of the set of images contain stray light simulated for the space-related optical system;
   (b) for each image of the set of images,
   identify one or more clusters of light contained in a respective image, wherein the one or more clusters of light are identified using an unsupervised machine learning algorithm, and
   label the respective image by the one or more clusters of light, wherein the respective image is labeled pixel-wise, wherein each pixel of the respective image is assigned at least one label indicating to which of the one or more clusters of light the pixel belongs, wherein the one or more clusters of light comprise a cluster of nominal light, which is the most bright cluster of light contained in the respective image, wherein the one or more clusters of light further comprise at least one cluster of stray light, wherein each of the at least one cluster of stray light identified in the respective image is representative of a different shape of stray light contained in the respective image; and
   (c) create, based on the labeled images of the set of images, a plurality of new labeled images by applying mathematical image transformations to the labeled images to generate an augmented set of labeled images, wherein the transformations comprise at least one of rotation, translation, scaling, amplitude adjustment or any other type of image transformation which creates variance in the newly created labeled images, and wherein at least one of the transformations applied to the labeled images is performed cluster-wise, such that each transformation is performed on one of the one or more clusters of light independently from the transformations performed on others of the one or more clusters of light, so that, for each cluster, a different transformation may be applied.

10. A computing unit for generating a labeled set of images for use in machine learning based stray light characterization for space-related optical systems, the computing unit comprising at least one processor and at least one memory, the at least one memory containing instructions executable by the at least one processor such that the computing unit is operable to:
    (a) obtain a set of images simulated for a space-related optical system, wherein the images of the set of images contain stray light simulated for the space-related optical system;
    (b) for each image of the set of images,
    identify one or more clusters of light contained in a respective image, wherein the one or more clusters of light are identified using an unsupervised machine learning algorithm, and
    label the respective image by the one or more clusters of light, wherein the respective image is labeled pixel-wise, wherein each pixel of the respective image is assigned at least one label indicating to which of the one or more clusters of light the pixel belongs, wherein the one or more clusters of light comprise a cluster of nominal light, which is the most bright cluster of light contained in the respective image, wherein the one or more clusters of light further comprise at least one cluster of stray light, wherein each of the at least one cluster of stray light identified in the respective image is representative of a different shape of stray light contained in the respective image; and
    (c) create, based on the labeled images of the set of images, a plurality of new labeled images by applying mathematical image transformations to the labeled images to generate an augmented set of labeled images, wherein the transformations comprise at least one of rotation, translation, scaling, amplitude adjustment or any other type of image transformation which creates variance in the newly created labeled images, and wherein at least one of the transformations applied to the labeled images is performed cluster-wise, such that each transformation is performed on one of the one or more clusters of light independently from the transformations performed on others of the one or more clusters of light, so that, for each cluster, a different transformation may be applied.

* * * * *